3,362,247
SUPPORT FOR ADJUSTABLE STEERING WHEEL
Walter A. Watts, Rock Island, Ill., assignor to International Harvester Company, a corporation of Delaware
Filed Aug. 30, 1965, Ser. No. 483,476
7 Claims. (Cl. 74—493)

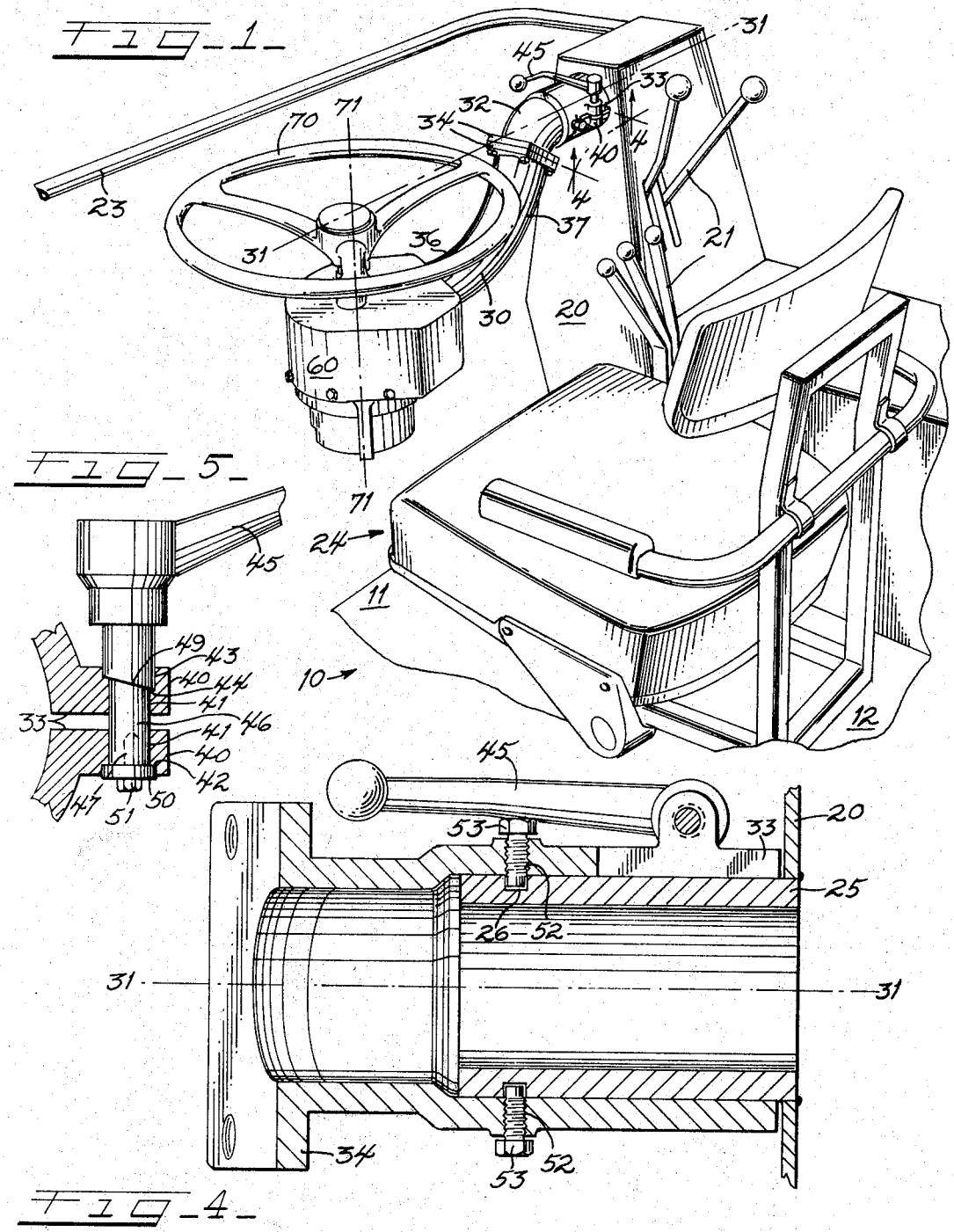

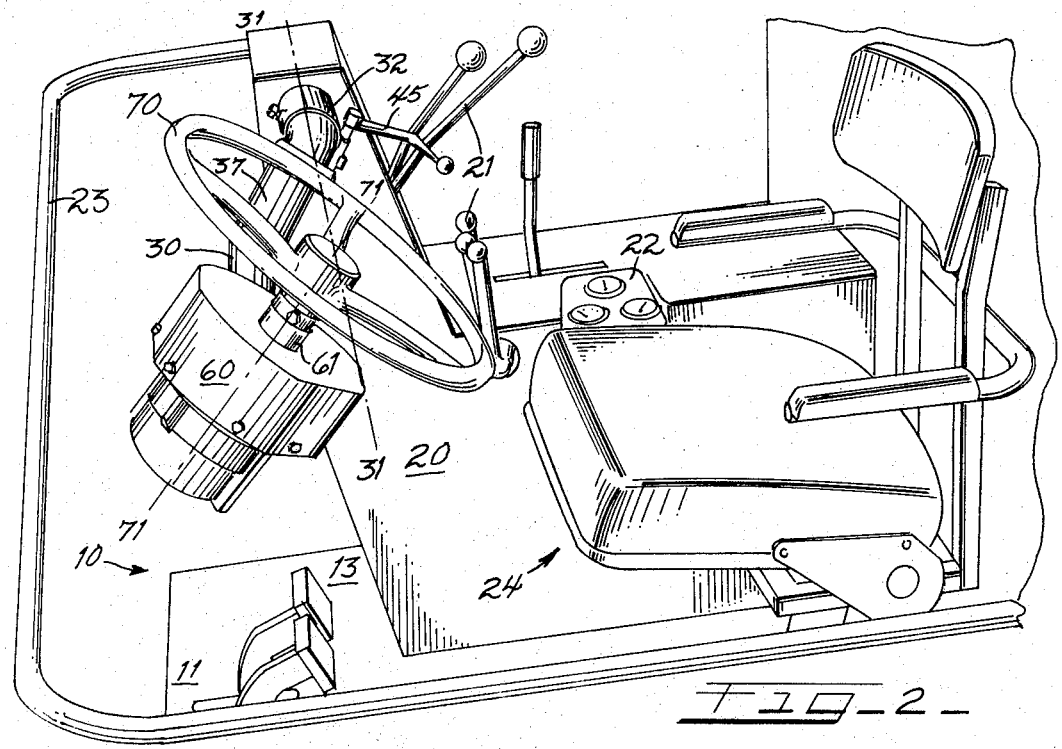
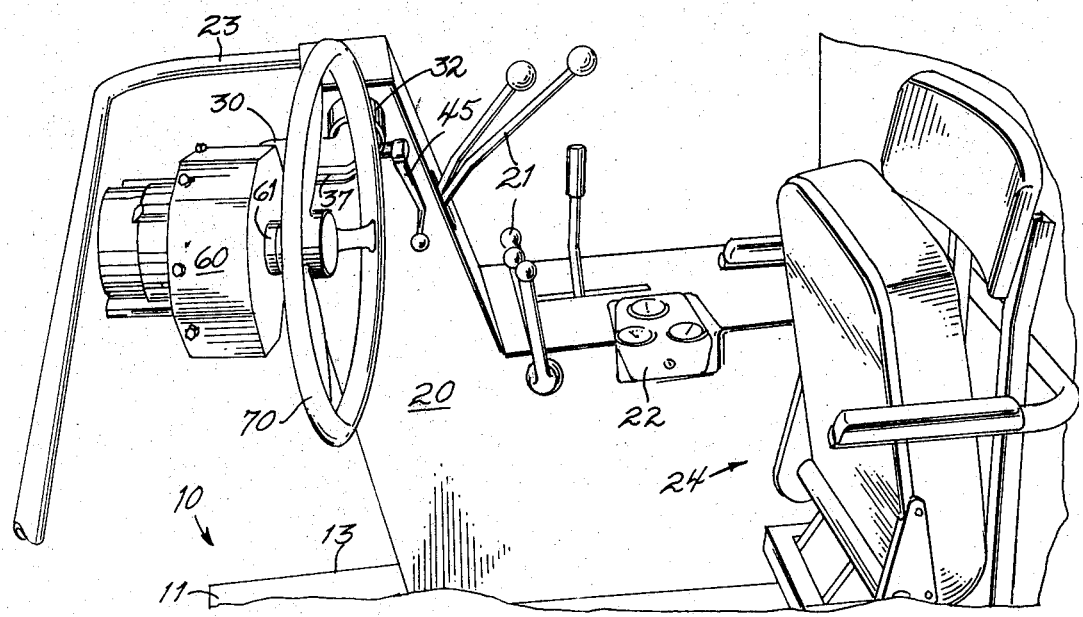

ABSTRACT OF THE DISCLOSURE

An adjustable steering wheel support including an elongated column having offset end portions. The column is pivotally supported about a horizontal axis at one end and carries the steering and hydraulic valve at its free end. The plane of the steering wheel and its location relative to the operator's seat, can be adjusted by pivoting the elongated column.

---

This invention relates to adjustable controls and more particularly to an adjustable steering wheel for a self-propelled agricultural or industrial vehicle.

An object of this invention is to provide an adjustable steering mechanism that will permit the attitude of the steering wheel to be adjusted to accommodate the operator in both the seated and the standing position.

A further object is to provide an adjustable steering device that will permit an unobstructed view to the front or direction of travel of the vehicle.

Still another object is to provide an adjustable steering mechanism that will increase the clearance between the steering wheel and the operator's seat when the steering wheel is changed from a position appropriate for seated operation to a position appropriate for standing operation.

Another object is to provide an adjustable steering mechanism that will raise the uppermost portion of the steering wheel when the steering wheel is changed from a position appropriate for seated operation to a position appropriate for standing operation.

Yet another object of the invention is to provide an adjustable steering mechanism with a simple accessible control for changing the position of the steering wheel.

Further objects of the invention will in part be obvious and will in part appear hereinafter.

The invention accordingly comprises the apparatus possessing the construction combination of elements and arrangement of parts which are exemplified in the following detailed disclosure and the scope of the application of which will be indicated in the claims.

For further understanding of the nature and objects of the invention, reference should be had to the following detailed description taken in connection with the accompanying drawings wherein:

FIGURE 1 is a perspectice view of the adjustable steering mechanism showing the steering wheel in a horizontal plane.

FIGURE 2 is a perspective view of the adjustable steering mechanism showing the steering wheel in a plane at an acute angle to the horizontal.

FIGURE 3 is a perspective view of the adjustable steering mechanism showing the steering wheel in a vertical plane.

FIGURE 4 is an enlarged cross-sectional view taken along lines 4—4 of FIGURE 1, and FIGURE 5 is an enlarged view of the locking mechanism for the adjustable steering column.

In the operation of many farm and industrial self-propelled vehicles, it is advantageous for the operator to have a clear unobstructed view towards the front or direction of travel of the vehicle. For example, in the operation of a combine, a cotton picker or a corn picker, the operator must be able to see the crops being processed by his machine. Since the operator's platform on machines such as a combine or cotton picker is located above and slightly to the rear of the point where the crops are being processed, it is desirable that the operator have a clear unobstructed view of the area immediately in front and below his platform. The conventional steering column, of course obstructs the operator's forward view in this area, and for this reason is undesirable. The conventional vertical steering column has been eliminated by this invention and the forward visibility of the operator has thus been enhanced.

During the operation of self-propelled farm or industrial vehicles, the operator often chooses to stand rather than sit, and if the position of the steering wheel cannot be correspondingly adjusted, the operator is often uncomfortable or in an unsuitable position relative to the controls. His reason for standing can either be for better visibility or to relieve the fatigue of remaining in one position for a long period of time. In the seated position the operator's knees normally extend under the generally horizontal steering wheel, and the rearmost edge of the steering wheel is relatively close to the front edge of the operator's seat. If the operator were to attempt to stand with the steering wheel and seat in this position, he would find that the steering wheel is too low and that there is not sufficient space between the steering wheel and the operator's seat to permit him to stand comfortably. In accordance with this invention the steering wheel can be adjusted about a horizontal axis lying in the plane of the steering wheel. Thus by changing the position of the steering wheel from a position wherein it lies in a horizontal plane to a position wherein it lies in a vertical plane, the top of the steering wheel is elevated a distance equal to one-half the steering wheel diameter, and the clearance between the steering wheel and the operator's seat is increased by an amount equal to one-half the diameter of the steering wheel. The advantage to the operator as a result of these substantial changes in these critical dimensions emphasizes the usefulness of this invention.

The subject invention is applied to vehicles in which hydrostatic steering systems are being used. In a hydrostatic steering system the steering wheel is connected to the spool of a hydraulic valve adjacent the steering wheel and the motion of the steering wheel is transmitted to the dirigible wheels through hydraulic lines connected to the hydraulic valve. There are no mechanical connections necessary between the steering wheel and the dirigible wheels of the vehicle. A steering system such as this is described in U.S. Patent No. 3,059,717 to D. W. Moyer et al. of Oct. 23, 1962. Reference may be made to this patent for a detailed disclosure of a hydrostatic steering system.

Referring now to FIGURES 1 through 3, inclusive, an operator's platform generally designated 10 having a front portion 11, a back portion 12 and side portions 13 as illustrated. On the right-hand side of the operator's platform 10, there is a vertical support 20. The vertical support in addition to forming the support for the adjustable steering wheel, functions as a housing for other controls 21 and dials 22. For the protection of the operator, the operator's platform 10 is surrounded by a railing 23. The operator's seat designated 24 is located centrally and on the back portion 12 of the operator's platform.

As can be best seen in FIGURE 4, a stub tube 25 is secured by welding or the like to the vertical support 20 and is arranged along a generally horizontal axis 31—31 across the operator's platform. An annular groove 26 is formed in the outer surface of the stub tube 25 for a purpose that shall be fully discussed later.

The steering column 30 is of a tubular construction and is adapted to be journaled on this stub tube 25 for pivotal rotation thereto. The steering column 30 has a first end portion 32, a free end portion 36 and an intermediate portion 37 that connects the end portions. The free end portion 36 is offset from the generally horizontal axis 31—31 thus causing the free end portion 36 to have a circular locus when the steering column 30 is rotated about the stub tube 25. As illustrated, the steering column 30 is constructed of two separate pieces that are joined by abutting flanges 34 connected by nuts and bolts.

The steering column 30 can be rotated to a desired position on the stub tube 25 and then locked in the selected position.

A longitudinal slot 33 is formed in the first end portion 32 of the steering column and tabs 40 protrude radially from the slot. As can be best seen in FIGURE 5, aligned bores 41 are formed in the tabs 40. The lower tab shown in FIGURE 5 is countersunk as indicated at 42 and the upper tab is countersunk as indicated at 43. The surface 44 of countersink 43 is at an angle to the axis of the bore 41. A control handle 45 adapted to be grasped by the operator is provided with a rod 46 that is adapted to extend into bore 41. The rod 46 has an enlarged portion terminating in a shoulder 49. The shoulder 49 is at an angle to the axis of the rod and is adapted to cooperate with the surface 44 of the countersink 43. A tapped hole 47 is formed in the free end of rod 46. The rod 46 of control handle 45 is inserted into the bore 41 and a washer 50 and bolt 51 are connected to the rod to retain the rod in the bore 41. If the control handle 45 is rotated in either direction from the position of the control handle, as seen in FIGURE 5, the interaction of the surface 44 against the shoulder 49 will cause the tabs 40 to move closer to each other thus closing the longitudinal slot 33. This will, of course, decrease the effective diameter of the first end portion 32 of the steering column and lock it in place on the stub tube 25. When it is desired to readjust the position of the steering column 30, the control handle 45 is moved back to the position shown in FIGURE 5 at which position free pivotal movement of the steering column on the stub tube is permitted. After manually repositioning the steering column to the new position, the control handle is again turned to lock it in the new selected position.

As can be best seen in FIGURE 4, threaded apertures 52 are formed in the first end portion 32 of the steering column that are adapted to be aligned with the annular groove 26. Bolts 53 are threaded into the apertures 52 and the end portions of the bolts 53 are adapted to protrude into the annular groove 26 thus forming a guide way between the first end portion 32 and the stub tube 25 to prevent the accidental removal of the steering column from the stub tube.

A hydraulic steering valvve 60 of the type disclosed in the above referred to Moyer et al. Patent No. 3,059,717 is rigidly mounted on the free end portion 36 of the steering column 30. The hydraulic steering valve 60 has a spool 61 etxending therefrom upon which is mounted a steering wheel 70. The steering axis 71—71 of the steering wheel is normal to the generally horizontal axis 31—31 and these axes intersect at a point in the plane of the steering wheel. The steering wheel lies in a plane of which the generally horizontal axis 31 constitutes a line. Thus it is seen that as the steering column 30 is pivoted about the stub tube 25, the steering wheel 70 is being pivoted about the generally horizontal axis 31.

As can be seen by examining FIGURES 1 through 3, inclusive, the steering wheel can be positioned in a horizontal plane, a vertical plane or any intermediate plane desired by the operator. The control handle 45 for changing the position of the steering wheeel is easily accessible to the operator and can be manipulated from the operator's seat. The tubular construction of the steering column is used to accommodate the hydraulic tubing connecting the hydraulic steering valve 60 to the other components of the hydrostatic steering system.

Obviously many modifications and variations of the present invention are possible in the light of the above teachings. It is therefore to be understood that terms used in the appended claims such as horizontal axis, axis normal to said horizontal axis and intersection of said axes are used to define the spirit of the invention and are not to be interpreted in their most precise meaning.

What is claimed is:

1. An adjustable steering mechanism for dirigible vehicles and the like having an operator's platform, said operator's platform being defined by front, rear and side portions, a vertical support connected to said vehicle and located adjacent and above one of said side portions, an elongated column pivotally mounted at one end on said vertical support about a generally horizontal axis, said column having a free end that is offset from said generally horizontal axis such that when said column is pivoted about said generally horizontal axis, said free end has a circular locus, a hydraulic valve for a fluid steering system carried by the free end of said column, a steering wheel connected to said column through said hydraulic valve, said steering wheel adapted to rotate about a steering axis normal to said generally horizontal axis, and said steering axis intersecting an axial plane of said generally horizontal axis.

2. The invention as set forth in claim 1 wherein said steering wheel lies in a plane, and said horizontal axis constitutes a line in said plane such that the plane of said steering wheel is pivoted about said horizontal axis.

3. An adjustable steering wheeel for a dirigible vehicle, said vehicle having an operator's platform defined by front, back and side portions, a vertical support located adjacent and above a side portion of said operator's platform, a stub tube secured to said vertical support extending along a horizontal axis over said operator's platform, a tubular steering column having a first end portion journaled on said stub tube such that the column can be pivoted about said horizontal axis, said column having a second end portion offset from said first end portion and said horizontal axis such that when said steering column is pivoted about said horizontal axis, said second end portion has a circular locus, a hydraulic steering valve secured to the second end portion of said steering column, a steering wheel connected to said steering column through said hydraulic steering valve, said steering wheel having an axis of rotation that is generally normal to said horizontal axis, and said steering axes intersecting an axial plane of said generally horizontal axis.

4. The invention as set forth in claim 3 wherein said steering wheel lies in a plane, and said horizontal axis constitutes a line in said plane such that the plane of said steering wheeel is pivoted about said horizontal axis.

5. The invention as set forth in claim 3 wherein means are provided for locking said steering column in a selected position on said stub tube.

6. The invention as set forth in claim 5 wherein said means for locking said steering column in a selected position on said stub tube comprises a longitudinal slot formed in the first end portion of said steering column and means for decreasing the width of said slot to frictionally lock said steering column on said stub tube.

7. The invention as set forth in claim 5 wherein an annular groove is formed in the outer surface of said stub tube, an aperture formed in said first end portion of said steering column overlying said groove and means connected to said steering column and protruding from said aperture into said annular groove to retain said steering column on said stub tube.

References Cited

UNITED STATES PATENTS

| | | | |
|---|---|---|---|
| 871,109 | 11/1907 | Coates | 74—493 |
| 1,086,367 | 2/1914 | Hope | 285—276 X |
| 3,216,521 | 11/1965 | Ulrich | 74—493 X |
| 3,279,277 | 10/1966 | Stevens et al. | 74—493 |

MILTON KAUFMAN, *Primary Examiner.*